United States Patent [19]

Ross et al.

[11] 3,925,237
[45] Dec. 9, 1975

[54] NOVEL LIQUID CRYSTAL ELECTRO-OPTIC DEVICES

[75] Inventors: Daniel Louis Ross, Princeton; Dragan Milan Gavrilovic, Cranbury, both of N.J.

[73] Assignee: RCA Corporation, New York, N.Y.

[22] Filed: June 28, 1974

[21] Appl. No.: 484,085

[52] U.S. Cl. ...... 252/299; 252/408 LC; 260/465 D; 350/160 LC
[51] Int. Cl.$^2$ .............. C09K 3/34; C07C 121/50; C07C 121/60; C07C 121/66; C07C 121/74; C07C 121/75; C07C 121/76; G02B 5/23
[58] Field of Search .................... 252/299, 408 LC; 350/160 LC; 260/465 D

[56] References Cited
FOREIGN PATENTS OR APPLICATIONS

| | | | |
|---|---|---|---|
| 2,327,036 | 12/1973 | Germany | 252/299 |
| 2,306,739 | 8/1973 | Germany | 252/299 |

OTHER PUBLICATIONS

Gray, G. W. et al., Electronics Letters, Vol. 9, No. 6, pp. 130–131 (3/22/73).
Castellano, Joseph A. et al., J. Org. Chem., Vol. 33, pp. 3501–3504, (Sept. 1968).
Kast, Landolt-Bornstein, 6th Ed., Vol. 2, Part 2A, pp. 266–335 (1960).
Gray, G. W. & Winsor, P. A., Liquid Crystals & Plastic Crystals, Vol. 1, pp. 103–152, Ellis Horwood Ltd., London (1974).

Primary Examiner—Benjamin R. Padgett
Assistant Examiner—T. S. Gron
Attorney, Agent, or Firm—G. H. Bruestle; B. E. Morris

[57] ABSTRACT

Nematic liquid crystal compounds of the

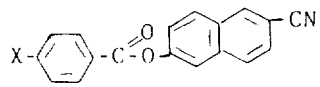

wherein X can be R-, RO-,

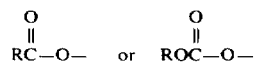

and wherein R is an alkyl group of 1–10 carbon atoms have positive dielectric anisotropy and are useful in field effect electrooptic cells which comprise a thin liquid crystal layer between two closely spaced parallel electrodes.

8 Claims, 1 Drawing Figure

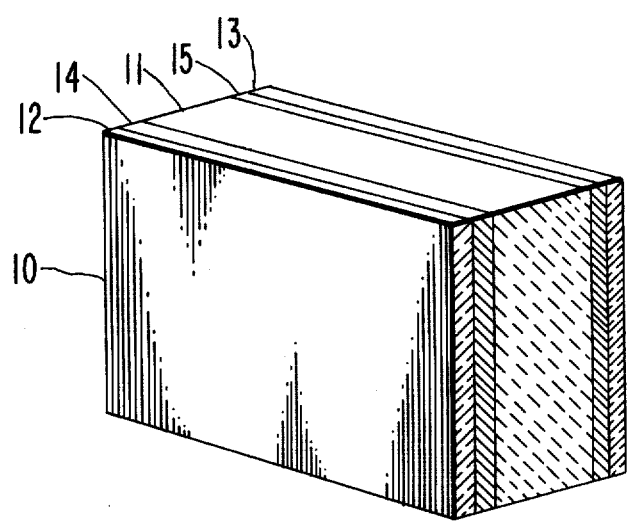

NOVEL LIQUID CRYSTAL ELECTRO-OPTIC DEVICES

This invention relates to novel liquid crystal compounds and to electro-optic devices including them. More particularly, this invention relates to nematic liquid crystal compounds having positive dielectric anisotropy and to field effect liquid crystal cells.

BACKGROUND OF THE INVENTION

Mesomorphic or liquid crystal compounds are of increasing interest in a variety of electro-optic display devices. Nematic liquid crystals are of particular interest for electrically controllable, flat panel displays such as watch faces, digital clocks, calculator displays, numeric displays for instruments and the like. Typically, a liquid crystal cell comprises a thin layer of a liquid crystal composition sandwiched between two closely spaced parallel conductive plates, at least one of which is transparent. When the conductive plates are connected to a source of current, an electric field is generated in the liquid crystal composition.

Nematic liquid crystal cells can operate in a dynamic scattering mode, as is described in U.S. Pat. No. 3,499,112 to Heilmeier and Zanoni, or in a field effect mode. Field effect devices contain nematic compounds or mixtures of compounds having positive dielectric anisotropy, that is, the magnitude of the dielectric constant in a direction parallel to the long axis of the molecular chain is greater than the magnitude of the dielectric constant in a direction perpendicular to the long axis of the molecular chain, between conductive plates that have been treated so that the liquid crystal molecules align themselves in a particular direction, usually parallel, to the plane of the plates. When an electric field is applied, the positive dielectric anisotropy of the molecules causes the molecules to realign themselves in a direction parallel to the applied field and perpendicular to the plates. The change in alignment is made visible by using a polarizer and an analyzer on either side of the cell. Field effect liquid crystal cells have the advantages of lower threshold voltages and wider viewing angle than dynamic scattering cells and have excellent contrast and long lifetimes.

Each mesomorphic compound has a particular temperature range in which it is an ordered liquid, ranging from the solid to nematic liquid crystal melting point up to the temperature at which it forms an isotropic liquid. This is the temperature range useful in electro-optic cells. Although, as is known, wide variations in use temperature can be effected by employing mixtures of liquid crystal compounds that are compatible with each other, no single liquid crystal compound or mixture of compounds can satisfy all use temperature ranges desired. Thus, new liquid crystal compounds which have different use temperature ranges are being sought to satisfy various temperature requirements for which the liquid crystal cells will be employed.

SUMMARY OF THE INVENTION

We have discovered certain nematic liquid crystal compounds derived from 6-cyano-2-naphthol which have positive dielectric anisotropy and have a broad range of mesomorphic temperature useful in flat panel electro-optic devices.

BRIEF DESCRIPTION OF THE DRAWING

The FIGURE is a cross-sectional view of an electrooptic device embodying the invention.

DETAILED DESCRIPTION OF THE INVENTION

The novel liquid crystal compounds have the formula

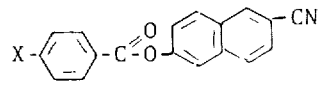

wherein X can be R-, RO-,

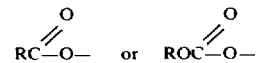

wherein R is an alkyl group of 1–10 carbon atoms. Thus X can be an alkyl group, an alkoxy group, an acyloxy group or an alkylcarbonato group respectively. Both branched chain and straight chain alkyl groups are contemplated, but straight chain alkyl groups are presently preferred. These compounds are stable nematic compounds having relatively high and very broad use temperature ranges. They can be employed in electrooptic devices alone, in admixture with each other or admixed with other compatible liquid crystal compounds to broaden the use temperature ranges or vary the response of the cell.

The present compounds can be prepared by reacting 6-bromo-2-naphthal with cuprous cyanide to form the corresponding nitrile and reacting the nitrile with the desired p-substituted benzoyl chloride. The nematic compound can be purified in conventional manner, as by recrystallization, fractional distillation or chromatography.

Referring to the FIGURE, a liquid crystal cell 10 comprises a layer of a liquid crystal composition 11 between a front transparent support plate 12 and a back support plate 13. The front support plate 12 is coated on the inside with a transparent conductive layer 14 to form an electrode. The back support plate 13 is also provided on the inside with a conductive layer 15 to form the other electrode. If light is to be transmitted through the cell, the back electrode 15 and the back support plate 13 are also transparent. If the liquid crystal cell is to reflect light, the back electrode 15 can be made reflective. As is known, additional compounds such as wetting agents, aligning agents and the like can be added to the liquid crystal composition to improve the optical or electrical performance of the cell. The electro-optic devices described above can be incorporated into various displays, such as electronic clocks, watches, advertising displays, numeric indicators and the like.

The invention will be further illustrated by the following examples but it is to be understood that the invention is not meant to be limited to the details described therein. In the examples, parts and percentages are by weight unless otherwise noted.

The transition temperatures of the compounds prepared in the examples were determined using a Thomas Hoover melting point apparatus, a differential scanning calorimeter and a polarizing hot stage microscope in conventional manner.

EXAMPLE 1

Part A — Preparation of 6-cyano-2-naphthol

A reaction mixture of 22.3 parts of 6-bromo-2-naphthol, 11.2 parts of cuprous cyanide and 60 parts by volume of dimethylformamide was charged to a vessel equipped with a magnetic stirrer and reflux condenser and refluxed with stirring for 20 hours. The mixture was poured into 300 parts of 18 percent hydrochloric acid, stirred, cooled to room temperature and extracted with three 300 parts by volume portions of ether. The combined ether extracts were washed with two 200 part portions of water, dried over anhydrous sodium sulfate, filtered and the solvent evaporated.

The yellow solid residue was recrystallized from benzene and dried under vacuum at room temperature. The product, 6-cyano-2-naphthol, was obtained in 65 percent yield (11.0 parts) having a melting point of 161°–164.5°C.

Part B — Preparation of p-n-hexylcarbonatobenzoic acid

A solution of 80 parts of sodium hydroxide in 2000 parts of water was cooled below 10°C. and 138.1 parts of p-hydroxybenzoic acid stirred in. To this solution 164.6 parts of hexylchloroformate was added dropwise over a one-half hour period while stirring. Stirring was continued at 5°–10°C. for 1 hour and the resultant mixture extracted with 500 parts by volume of ether. An excess of 18 percent hydrochloric acid (200 parts by volume) was stirred into the aqueous solution to precipitate the product. The precipitate was filtered off, washed with water, dissolved in 1500 parts by volume of ether, dried over anhydrous sodium sulfate, filtered and the solvent evaporated.

The product (239 parts) had a melting point of 120°–126°C.

Part C — Preparation of p-n-hexylcarbonatobenzoyl chloride

The product as prepared in Part B, 300 parts by volume of benzene and 150 parts by volume of thionyl chloride were charged to a vessel equipped with a magnetic stirrer and a reflux condenser having a drying tube thereon. The mixture was stirred and refluxed for 5 hours. The solvent was evaporated under vacuum and the product distilled twice at 140°–142°/0.08 mm. The product was obtained in 81.8 percent yield (209.7 parts).

Part D — Preparation of p-n-hexylcarbonato-(6-cyano-2naphthyl)benzoate

Into a vessel equipped as in part A were charged 1.69 parts of 6-cyano-2-naphthol, 2.85 parts of p-n-hexylcarbonatobenzoyl chloride, 3 parts by volume of pyridine and 50 parts by volume of benzene. The mixture was stirred and refluxed for 1.5 hours, cooled to room temperature and filtered. The filtrate was washed twice with 50 part portions of 9 percent hydrochloric acid and then with 100 parts of water. The organic layer was collected, dried over anhydrous sodium sulfate, filtered and the solvent evaporated. The solid residue was recrystallized three times from ethyl acetate and dried under vacuum. This compound has the formula:

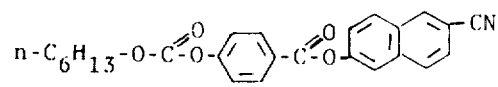

The liquid crystal product had a crystal to nematic liquid transition temperature of 85°–87°C. and a nematic liquid to isotropic liquid transition temperature of 155°C.

Example 2 — Preparation of p-n-pentylcarbonato-(6-cyano-2-naphthyl)benzoate

Following the procedure of Example 1, part D, except substituting p-n-pentylcarbonatobenzoyl chloride for p-n-hexylcarbonatobenzoyl chloride, p-n-pentylcarbonato-(6-cyano-2-naphthol) benzoate having the formula:

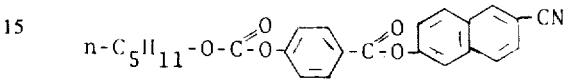

was obtained.

This compound had a crystal to nematic transition temperature of 115°–116°C. and a nematic to isotropic liquid transition temperature of 165°C.

EXAMPLE 3

Part A — Preparation of p-n-heptyloxybenzoyl chloride

A reaction mixture of 23.6 parts of p-n-heptyloxybenzoic acid, 40 parts by volume of benzene and 18.0 parts of thionyl chloride were charged to a reaction vessel equipped as in Example 1, Part C. The mixture was stirred and refluxed for 5 hours. The solvent and unreacted thionyl chloride were evaporated and the product distilled under vacuum.

The product had a boiling point of 132°C./0.15 mm Hg.

Part B — Preparation of p-n-heptyloxy-(6-cyano-2-naphthyl)-benzoate

The general procedure of Example 1, Part D, was followed except substituting the benzoyl chloride prepared as in Part A of this example for the p-n-hexylcarbonato-benzoyl chloride. The product was recrystallized twice from acetone and had the formula:

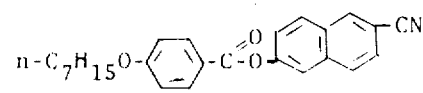

The transition temperatures were: crystal to nematic liquid, 72°–72.5°C.; nematic to isotropic liquid, 154.5°C.

EXAMPLE 4

Preparation of p-n-butoxy-(6-cyano-2-naphthyl)-benzoate

The procedure of Example 3 was followed except substituting the corresponding p-n-butoxybenzoyl chloride for the p-n-heptyloxybenzoyl chloride to prepare a compound having the formula:

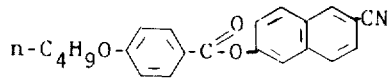

The transition temperatures were: crystal to nematic liquid, 104.5–105.5°C.; nematic to isotropic liquid, 176°C.

EXAMPLE 5

Preparation of p-n-octyloxy-(6-cyano-2-naphthyl)benzoate

The procedure of Example 3 was followed except substituting p-n-octyloxybenzoyl chloride for p-n-heptyloxybenzoyl chloride to prepare a compound having the formula:

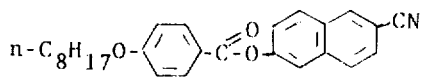

The transition temperatures were: crystal to nematic liquid, 78°–79°C.; nematic to isotropic liquid, 145°–146°C.

EXAMPLE 6

Preparation of p-n-decyl-(6-cyano-2-naphthyl)-benzoate

The procedure of Example 1 was followed except substituting p-n-decylbenzoic acid for p-n-hexylcarbonatobenzoic acid to prepare a compound having the formula:

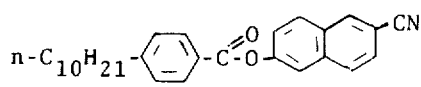

The transition temperatures were: crystal to smectic liquid, 72°–73°C; smectic to nematic liquid, 119°–120°C. and nematic to isotropic liquid, 126°C.

EXAMPLES 7–10

The procedure of Example 1 was followed except substituting the corresponding p-n-alkyl-substituted benzoic acid for the p-n-hexylcarbonatobenzoic acid. The Table below identifies the alkyl substituent and presents the transition temperatures, wherein C-N is crystal to nematic liquid transition temperature and N-L is nematic to isotropic liquid transition temperature.

TABLE

| Example | Alkyl Group | C-N, °C. | N-L, °C. |
|---|---|---|---|
| 7 | $CH_3-$ | 119.5–120.5 | 173.5 |
| 8 | $n-C_3H_7$ | 97–98 | 157.5 |
| 9 | $n-C_5H_{11}-$ | 96–97 | 145.5 |
| 10 | $n-C_6H_{13}$ | 102.5–103.5 | 135 |

EXAMPLE 11

Part A — Preparation of p-n-hexanoyloxybenzoic acid

A reaction mixture of 19.0 parts of p-hydroxybenzoic acid, 42.8 parts of hexanoic anhydride, 15 parts by volume of benzene and one part by volume of sulfuric acid was charged to a vessel equipped with a magnetic stirrer and a reflux condenser. The mixture was refluxed for 15 minutes, poured over 300 parts of ice-water mixture, stirred and extracted with 300 parts by volume of methylene chloride. The organic extract was dried over anhydrous sodium sulfate, filtered and the solvent was evaporated. The resultant product was recrystallized from 700 parts by volume of hexane.

The product was a monotropic liquid crystal compound having a crystal to isotropic liquid melting point of 152°–153°C. and an isotropic to nematic liquid transition temperature of 138°C.

Part B — Preparation of p-n-hexanoyloxybenzoyl chloride

This compound was prepared following the procedure of Example 1, part c, except substituting p-n-hexanoyloxybenzoic acid for p-n-hexylcarbonatobenzoic acid. The product was distilled at 125°C./0.1 mm.

Part C — Preparation of p-n-hexanoyloxy-(6-cyano-2-naphthyl)benzoate

The procedure of Example 1, Part D, was followed except substituting p-n-hexanoyloxybenzoyl chloride for p-n-hexylcarbonatobenzoyl chloride. The compound has the formula:

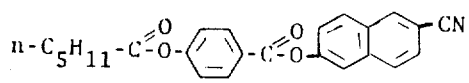

has a crystal to nematic liquid transition temperature of 92.5°–93.5°C. and a nematic to isotropic liquid transition temperature of 179.5°C.

We claim:

1. In an electro-optic cell comprising a liquid crystal layer between two electrodes, the improvement which comprises including in the liquid crystal layer a compound of the formula

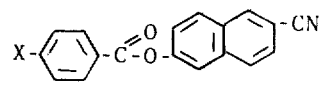

wherein X is a member selected from the group consisting of R—, RO—,

wherein R is an alkyl group having 1–10 carbon atoms.

2. The device according to claim 1 wherein both electrodes are transparent.

3. A liquid crystal compound having the formula

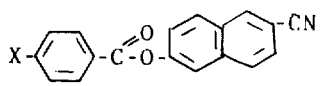

wherein X is a member selected from the group consisting of R-, RO-,

wherein R is an alkyl group having 1–10 carbon atoms.

4. A compound according to claim 3 wherein X is the R- group.

5. A compound according to claim 3 wherein X is the RO- group.

6. A compound according to claim 3 wherein X is the

group.

7. A compound according to claim 3 wherein X is the
group.
8. A compound according to claim 3 wherein X is a straight chain alkyl group having 1–10 carbon atoms.
* * * * *